United States Patent [19]

Simms et al.

[11] Patent Number: 4,521,239
[45] Date of Patent: Jun. 4, 1985

[54] COATING AGENT FOR PARTICULATE MATERIALS

[75] Inventors: Douglas P. Simms, Jackson, Miss.; Joseph M. Dobbs, Austin, Tex.

[73] Assignee: Mississippi Chemical Corporation, Yazoo City, Miss.

[21] Appl. No.: 444,882

[22] Filed: Nov. 29, 1982

[51] Int. Cl.³ .............................................. C05C 1/00
[52] U.S. Cl. ...................................... 71/27; 71/64.13
[58] Field of Search ................... 71/27, 59, 62, 64.07, 71/11, 64.11, 64.12, 64.13; 427/212, 214; 428/405, 403, 447, 407

[56] References Cited

U.S. PATENT DOCUMENTS

| | | | |
|---|---|---|---|
| 3,110,614 | 11/1963 | de Vries | 428/405 |
| 3,944,705 | 3/1976 | Fujioka et al. | 428/331 |
| 4,318,843 | 3/1982 | Köhler et al. | 523/212 |
| 4,447,498 | 5/1984 | Fink et al. | 428/447 |

*Primary Examiner*—Howard S. Williams
*Attorney, Agent, or Firm*—Oblon, Fisher, Spivak, McClelland and Maier

[57] ABSTRACT

A particulate substrate provided with a protective coating, comprising particles of a substrate coated with the reaction product of at least one amine compound and a siloxane.

20 Claims, 1 Drawing Figure

COATING AGENT FOR PARTICULATE MATERIALS

BACKGROUND OF THE INVENTION

1. Field of the Invention

The present invention relates to a method of providing particulate materials with a protective coating. More particularly, the invention relates to the coating of particulate fertilizers such as ammonium nitrate with the reaction product of an amine and a siloxane.

2. Description of the Prior Art

In the past diatomaceous earth (DE) and treated clays have been used as a coating/conditioning agent for particulate fertilizers such as ammonium nitrate. However, for several reasons, diatomaceous earth is becoming increasingly unacceptable as a protective coating material for fertilizers. One reason is that the quality of diatomaceous earth, per se, has been declining as the better grades of the earth have been removed by mining. The inferior grades of DE have resulted in coatings which do not meet the stringent physical and chemical requirements for acceptable DE coatings. Storage and handling problems have resulted because of the inferior grades of DE which are being used.

Another disadvantage of using diatomaceous earth and clays is that there is always the undesirable problem of dust generation in the handling of diatomaceous earth since it is a relatively dry, small particle size solid. Usually, from about 1–1.5% by weight of DE is coated on ammonium nitrate particles. Not all of the DE, however, adheres to the fertilizer particles. This fact results in serious problems for ammonium nitrate manufacturing plants which are the likes of additional equipment maintenance, extra clean-up costs and the like. Moreover, there are serious customer handling problems involved with DE coated ammonium nitrate.

Yet another problem with diatomaceous earth is that the costs of agricultural grade diatomaceous earth have sharply increased over the past few years as the available supplies have decreased as a result of the diversion of supplies to other markets. Because diatomaceous earth suppliers no longer need the agricultural market as a consumer of their product, ammonium nitrate producers are placed in an increasingly more vulnerable and expensive position. A need, therefore, exists for a satisfactory replacement for diatomaceous earth as a fertilizer coating agent.

Various types of fertilizers have been coated with different materials in the past to produce a product of improved stability. Urea is usually coated with kaolin clay or is treated with formaldehyde to alleviate caking. However, kaolin, because of its very small particle size, is dusty. On the other hand, formaldehyde treatment of urea does not yield a completely satisfactory product.

Phosphate based fertilizers such as ammonium phosphate, superphosphate, homogeneous N-P-K fertilizers and the like, which when dried to very low water contents to reduce their caking tendencies, become quite dusty when handled. Fuel oil is frequently used as a surface coating material in order to suppress dust generation. While fuel oil exhibits some dust suppressing activity, it is not fully effective in this role, and is not a good use for an energy yielding substance.

Organic materials have been used in the past as coating materials for particulate fertilizers. Thus, Choi in U.S. Pat. No. 4,259,102 discloses a heterocyclic polymer which can be used as a fertilizer coating agent. Iwao, U.S. Pat. No. 3,660,070, shows the use of high molecular weight polymers of the vinyl and acrylate type as a coating agent. U.S. Pat. No. 3,388,990 provides a very similar type of disclosure. Passmore, U.S. Pat. No. 3,544,297, shows polyethylene, polyvinyl chloride and polyacrylonitrile as coating materials. Haruhiro, U.S. Pat. No. 3,475,154 discloses fertilizer particles coated with a multi-layered coating of a thermoplastic or thermosetting resin in order to provide a low water-soluble fertilizer. None of the above-discussed references provide any disclosure of either of the ingredients used in the coating agent of the present invention.

Hansen in U.S. Pat. No. 3,223,518 discloses a technique of providing a slow-release fertilizer by providing a particulate fertilizer substrate with a multi-layer coating, the outer layer being of a hydrophobic material. The reference further discloses the use of a primer coating which may be any substance selected from an extremely broad group of organic compounds. Hansen also describes that a major characteristic of the fertilizer product is its water durability which is characterized by solids which remain in the shell-like water-insoluble exterior coatings. Any fertilizer product which does not exhibit this characteristic, which includes the product of the present invention, presumably is outside the scope of the reference. Moreover, the fertilizer product of the present invention is not a slow-release multi-layer coated product having a hydrophobic exterior coating. Still further, the product of the reference possesses a large amount of coating material, i.e., about 7% by weight, while the amount of coating material applied to the present product is in most cases less than 0.1% by weight.

Bradley in U.S. Pat. No. 3,951,638, discloses a prilling process which at one point uses an organosilicon compound to prevent dust pick-up by fertilizer particles. Accordingly, the reference does not show the coating of fertilizer particles with an organic material. Assuming that the dust is an inert material, the organic material would seem to serve as a moisture barrier, which is a teaching contrary to the present invention.

Hijfte in U.S. Pat. No. 4,150,965 discloses the use of an alkylamine-mineral oil combination as a coating agent for ammonium nitrate fertilizer. The reference discloses a three-step coating process, while the present process is usually a one-step coating procedure. In the reference process an ammonium nitrate containing fertilizer is treated with the alkylamine while relatively hot, i.e., at least 5° C. above the melting point of the amine or mixture containing the amine. In fact, the reference discloses that prills at 50° C. cannot be coated satisfactorily, while in the present invention, on the other hand, superior coatings for ammonium nitrate can be achieved at temperatures less than 38° C. Another disclosure in the reference which is contrary to the present invention is that unadulterated alkylamine must be added to the fertilizer in the first process step. That is, the amine cannot be premixed with another compound if acceptable results are to be obtained. In the present process, an amine is, in fact, premixed with another reagent, i.e., a silicone fluid, before application to the fertilizer particles. Another difference between the reference disclosure and the present invention is that the reference does not disclose the coating procedure to be effective on fertilizers which do not contain a diluent. The working examples of the reference disclose fertilizers which contain a diluent. A need, therefore, continues to exist for a technique of providing particulate fertilizers, particularly ammonium nitrate, with an improved coating material.

SUMMARY OF THE INVENTION

Accordingly, one object of the present invention is to provide a protective coating for fertilizer particles which suppresses dusting, minimizes caking of the fertilizer particles and prill breakdown and makes handling of particulate fertilizer much easier.

Briefly, this object and other objects of the present invention as hereinafter will become more readily apparent can be attained by a particulate substrate provided with a protective coating of the reaction product of at least one amine compound and a siloxane. In a preferred embodiment of the invention the particulate substrate is prilled ammonium nitrate fertilizer.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
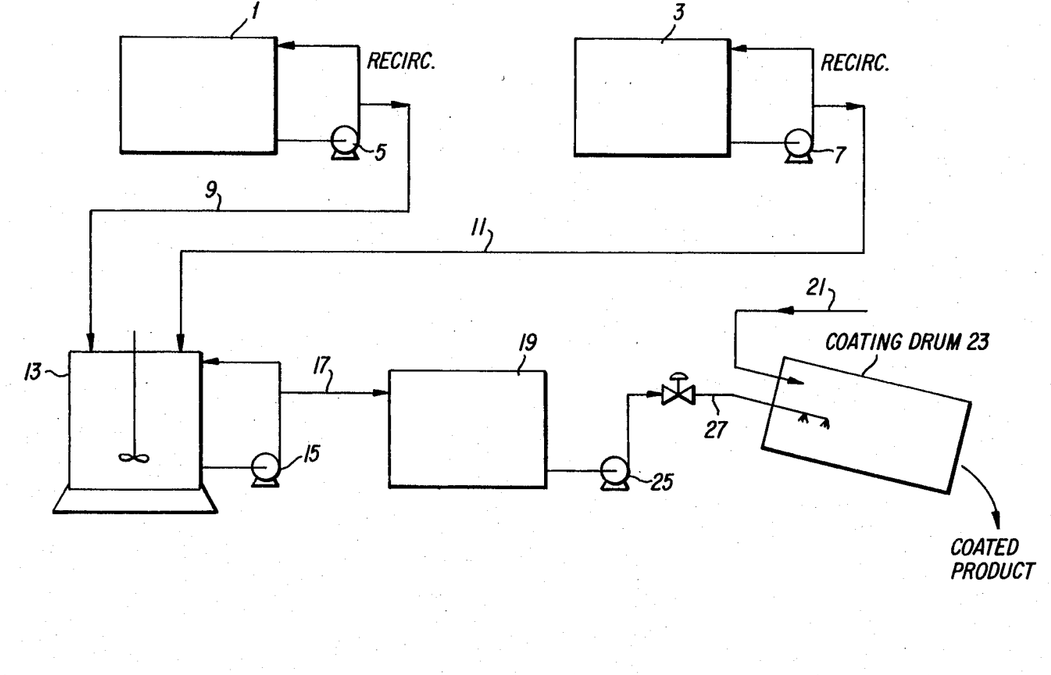
the FIGURE is a flow diagram showing the mixing of coating ingredients and application of the coating material of the present invention.

Any material which is to be successful as a coating agent for particulate fertilizers must possess several desirable characteristics. The coating agent must be compatible with the ferilizer material, i.e., it must not cause deterioration of the fertilizer nor render it hazardous, which is a particular concern with ammonium nitrate. Since the coated fertilizer is frequently handled by unprotected personnel and is applied to crop land, the coating agent must be nontoxic. In some instances where a hygroscopic salt is being coated such as in the case of ammonium nitrate, the fertilizer readily absorbs water from the ambient air. This results in caking and breakdown of the prilled fertilizer. Accordingly, an acceptable coating agent must substantially impede or eliminate moisture absorption by the particulate hygroscopic fertilizer. Another important aspect of the coating is that the coating on the particles must be sufficiently uniform to prevent particle-to-particle contact in uncoated areas of the particles. If this type of contact is not prevented during storage of the ammonium nitrate, caking of the fertilizer particles will result as bonding occurs between particles where there is insufficient coating material to prevent exposed surfaces of the particles from contacting each other. The raw materials for the coating agent must be in abundant supply so that production of coated fertilizer product in volume is not impeded. The coating agent must firmly bond to the fertilizer particles from the time it is applied until the coated fertilizer is applied to the crop land.

Other beneficial characteristics which the coating agent should possess, but which are not mandatory, are that the cost of the ingredients on a per ton fertilizer basis should be reasonable and it should be able to be easily handled from an operational standpoint. However, with regard to both of these factors, some expense and inconvenience can be tolerated as long as a superior coated fertilizer product is produced.

The coating agent of the present invention has been found to satisfy all of the above-described characteristics. The present coating agent is the reaction product of an amine and a polymeric siloxane.

The amine component of the present coating composition is a material which is semisolid or solid at room temperature. The amine should melt at a temperature of about 43° C. to about 93° C. and should not decompose at these temperatures. Suitable amines include primary, secondary and tertiary, straight and branched chain amines of 12 to 18 carbon atoms as well as amines containing cyclic hydrocarbon radicals. Saturated cyclic amines and saturated polyamines may also be used as long as they possess the above-desired physical properties. Mixtures of amine may also be used, and in fact, long chain fatty amines as obtained industrially are frequently a mixture of amine compounds and are quite suitable for use in the present invention. Amine containing unsaturated hydrocarbon and aromatic hydrocarbon radicals should be avoided when coating the likes of ammonium nitrate because of the increased danger of forming hazardous compositions. This is substantially much less of a factor when relatively less hazardous substrates are to be coated. A most preferred amine composition is a mixture of amines having the formula:

$$CH_3-(CH_2-CH_2)_x-CH_2-NH_2$$

wherein x is 6, 7 and 8. This particular mixture is characterized as follows:

(a) Solid at 24° C.
(b) Melting point (°C.): 49°–54° C.
(c) Freezing point (°C.): 43° C.
(d) Specific gravity (150/60), g/cc: 0.794
(e) Viscosity (66° C.) cp: 3
(f) Colorless
(g) 97% purity The siloxane reactant utilized as the other component of the coating composition should be a material which is slightly viscous at ambient temperatures or, if of higher molecular weight, should melt within the same temperature range as the amine. Alternatively, the solid siloxane should be such that it melts and homogeneously blends with the amine reactant over the temperature range of about 43° C. to about 93° C. Suitable siloxanes are those which contain lower alkyl, lower alkoxy and lower alkylamino substitution. The siloxane is preferably amine substituted, and can be polyamine substituted. The siloxane should not be a hydroxy siloxane. The scope of siloxanes employable, however, includes siloxanes having cyclic structures. A preferred siloxane is amino substituted polydimethylsiloxane of the following structure:

$$NH_2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_x-\underset{\underset{CH_3}{|}}{\overset{\overset{CH_3}{|}}{Si}}-NH_2$$

wherein x is a value such that the siloxane has the following characteristics:

(a) Fluid at 24° C.
(b) Specific gravity (75/75), g/cc: 0.985
(c) Viscosity (24° C.) cp: 53

(d) Colorless (e) 100% purity

An outstanding characteristic of the amine-siloxane mixture is that it should be a homogeneous mixture having a viscosity of less than 10 centipose under operating temperature conditions.

The amine and siloxane coating ingredients may be applied to fertilizer particles by any method which is industrially acceptable for providing the particles with a uniform and acceptable coating of the coating agent on the fertilizer particles. Both batch and continuous procedures can be used to mix the ingredients of the present composition. Since the amine used is most commonly solid at ambient temperatures, it is usually heated to a temperature sufficient to liquify the same. A temperature ranging from 54°-93° C. normally is sufficient to liquify the amine. The amine is then mixed with the siloxane in the amount desired for a time sufficient to obtain a homogeneous mixture. Mixing may be done in a simple stirred tank, in an in-line static mixer or other such similar device sufficient to prepare a homogeneous mixture of the two ingredients. The mixing device as well as all production apparatus, of course, should be made of materials which are not corroded by the reactants. The amount of mixed material prepared should be sufficient to coat a given quantity of fertilizer particles to a given depth of coating agent.

The amount of amine combined with the siloxane reactant can vary over a range with the essential requirement being a ratio of reactants which yields a coating composition having the characteristics stated above. A broad ratio range of the two reactants can be used with an acceptable amine:siloxane ratio ranging from 5/95 to 95/5. Ratios on either side of these limits can be used, however there is no advantage to be gained by exceeding these limits. A more preferred operating range is an amine:siloxane ratio range of 70/30 to 90/10.

The coating mixture prepared may be used immediately or it may be stored for later use. The nature of the coating mixture is such that personnel handling the product should use suitable protective clothing while handling the reagent. Preferably, the coating mixture is stored for no longer than a few days in the molten form since at elevated temperatures (above ambient) polymerization is promoted. If the coating mixture is to be stored for a period of time longer than several days, the mixture should be solidified by cooling, and then remelted before use. Storage under an inert atmosphere of a gas such as nitrogen is preferred.

Neither the coating mixture of the invention nor the amine reactant should be allowed to come into contact with hot ammonium nitrate melt. Because the amine is an organic material, contact of the amine with hot ammonium nitrate could produce a potentially hazardous situation. For this reason, all spills and residual ammonium nitrate with applied coating should be adequately disposed of and not recycled to the ammonium nitrate plant. For fertilizer materials which are not under such hazardous constraints, these precautions can be reduced or eliminated.

Precautions should also be taken in the handling of the siloxane and amine reactants before they are combined to form the coating mixture. High temperatures and exposure to air and moisture promote the polymerization of the siloxane. Accordingly, the siloxane reactant should be stored under an inert atmosphere such as nitrogen and at a temperature which does not exceed 43° C. Care should be used in the handling of hot amine fluid and therefore the wearing of protective clothing is advised. Prolonged skin contact with the amine may result in dermatitus. Slow decomposition of the amine can occur if the amine is heated to a temperature significantly above 93° C., and accordingly, the amine should be stored at a temperature no greater than this temperature. Since amines are capable of absorbing carbon dioxide from the atmosphere, the amine should also be stored under an inert atmosphere.

The chemical characteristics of the siloxane are such that they are moisture and oxygen sensitive in that the siloxanes harden upon exposure to the same. Accordingly, the siloxane should be stored under an inert gas atmosphere. In fact, the mixture of the amine and siloxane should be handled under an inert gas atmosphere, and as the mixture is being applied to the particulate substrate being coated.

The coating mixture once prepared and ready to use is in the liquid state. The mixture can be applied to the particulate fertilizer by any acceptable and reasonable method of applying a liquid to a particulate solid substrate in high volume commercial amounts. Usually, the warmed mixture is applied by such techniques as spraying, film rolling, spraying the liquid mixture onto a rotary drum onto which the fertilizer particles are dropped, and the like. The coating mixture must be kept at a temperature high enough so that the coating mixture remains liquid during application to the fertilizer particles. A temperature within the range of about 54° to about 93° C., preferably 65° C.-82° C. is sufficient to keep the mixture molten. Unlike some coating processes, it is not necessary to heat the fertilizer particles. In the case of ammonium nitrate fertilizer, the particulate product as obtained from production is at an elevated temperature. From the production standpoint, the particulate ammonium nitrate product can be conveniently coated while at a temperatue ranging from 31° C.-35° C. The nature of the coating mixture is such that it can be easily applied to ammonium nitrate fertilizer having a temperature range of 16° to 110° C.

No matter what method is used to coat the fertilizer particles, the only relatively critical factor with respect to contact time of the liquidified coating agent with the particles is that contact should only be long enough to obtain a uniform coating. When the roll coating technique is used, the particles should only roll a distance sufficient to obtain a uniform particle coating.

Once the particles are coated, they only need to be cooled before being bagged. In the event the coating is applied to cool fertilizer particles, no further cooling of the particles is necessary. In the case of ammonium nitrate forced convective cooling within the coating apparatus may be utilized, but is not necessary. Cooling of the particles, however, aids in the solidification of the applied coating agent. The coating agent will soidify by the conduction of heat away from the coating by the relatively cooler underlying fertilizer substrate when the fertilizer particles have been cooled to within the preferred temperature range. If convective cooling of the coated particles is employed, care must be taken to not cool the particles so fast that the coating agent does not have sufficient time to uniformly coat the particles.

The coating conditions are such that the weight of coating applied is that which provides a sufficiently protective coating. Usually, an amount ranging from 0.005 to 0.20% by weight is sufficient to give good results, with a more preferred amount ranging from 0.01-0.05% by weight. If the coating is less than 0.005% by weight, the particles may not be coated with a sufficient amount of coating agent to provide a uniform coating having the necessary characteristics described above. If the coating agent is applied in an amount in excess of 0.20%, additional costs are incurred without any further benefits being realized.

The coating agent of the invention may be utilized to coat materials other than fertilizer. Indeed, just about any particulate solid material which has a tendency to cake may be coated. The solid being coated must be compatible with the coating agent.

The FIGURE is a flow diagram of an embodiment of the process by which the present amine-siloxane coating material can be applied to a particulate substrate. Containers 1 and 3 are storage vessels for the amine and siloxane reactants respectively of the present coating composition. Both reactants are pumped from their respective storage vessels under an inert gas atmosphere by pumps 5 and 7 through lines 9 and 11 into mixing tank 13. After mixing of the ingredients, the mixture is pumped by means of pump 15 through line 17 into coating agent storage tank 19. Tanks 1, 3 and 13 are provided with lines 2, 4 and 6 respectively for recirculation of liquid ingredient therein, if such recirculation is desired. Ammonium nitrate prills from line 21 are passed into coating drum 23. Simultaneously, coating agent is withdrawn from storage tank 19 via pump 25 and sprayed into the coating drum 23 through line 27 where the fertilizer prills are coated with the agent. Coated ammonium nitrate prills are withdrawn from the drum.

Having generally described this invention, a further understanding can be obtained by reference to certain specific examples which are provided herein for purposes of illustration only and are not intended to be limiting unless otherwise specified.

EXAMPLE I

Ammonium nitrate prills were sprayed with a mixture of 70 parts by weight of the long chain fatty amine mixture described supra and 30 parts by weight of the amino substituted polydimethylsiloxane described supra until a coating level of 0.03 wt. % of the mixture was applied to the prills. The coating was applied to the prills at a temperature of 82° C. The prills were at a temperature of 31° C. when they were coated. The coated prills were prepared in only 15 minutes.

By the known procedure, ammonium nitrate prills were coated with diatomaceous earth. The coated prills were then subjected to the tests shown in Table I below, and the results obtained are also shown in the table.

The various tests by which the coated prills were characterized are as follows:

A. The 24-Hour Ball-Screen Hardness Test

A 100 g sample of −8 to +10 mesh prills was placed on a 12 mesh screen. One hundred twenty steel balls each of $\frac{3}{8}$" diameter were placed on the screen and the screen plus particles and balls were shaken on a Ro-Tap for 15 minutes. The amount of −12 mesh material generated was measured. The percentage of prills which remained unbroken is the measure of hardness. This test measures the impact resistance of the prills. The higher the index, the stronger the prills.

B. The Single Prill Hardness Test

From a sample of −8 to +10 mesh coated prills, 10 prills were randomly selected. Each prill was subjected to a compressive force until it fractured. The average breaking force required to break the prills was recorded in $kg/cm^2$. This test measures the resistance of the prill to crushing by a sustained, non-shock load.

C. Deformation Test

A 75 ml sample of coated prills was subjected in a metal cylinder to a constant pressure of 550 psig for 5 minutes. The volume before and after compression was determined to give the deformation value, calculated in percent. The degree of caking was subjectively determined based on the difficulty of removing the sample from the cylinder. The scale ranged as follows: (1) none, (2) very slight, (3) slight, (4) moderate, (5) hard and (6) very hard. This test measures the tendency of the fertilizer prills to cake by plastic deformation and/or capillary adhesion.

D. 24-Hour Caking Test

A 300 g quantity of coated fertilizer prills was subjected in a specially designed cylinder to about 45 psia for 24 hours. The severity of caking was determined by gradually increasing the pressure on the cylinder after removing a threaded plug from the bottom. The pressure required to force material through this opening was taken as the caking index. This test is a measure of the caking tendency of a fertilizer sample as a result of being subjected to plastic deformation and capillarity.

E. The Attrition Test

A 400 g amount of coated prills ranging in size from −8 to +10 mesh was driven through a laboratory screw conveyor ($2\frac{1}{4}$" diameter, 32" length) six times at a setting of 40 rpm. Dry air was blown through the apparatus after the last pass to remove all fines and dust. The entire sample was then placed on a 14 mesh screen and the screen plus sample material was shaken on a Ro-Tap shaker for 14 minutes. The material on the screen smaller than 14 mesh was weighed and calculated as the percent fines. The value obtained was used as the attrition value. This test measures the friability of the prills or the tendency of the same to break down as a result of attrition.

F. Accelerated Caking Test

A 285 ml amount of coated ammonium nitrate product was placed in a cylinder designed to permit exposure of the specimen to ambient conditions. The product was compressed under a pressure of 4 psig and maintained at a temperature of 32° C. and a relative humidity cycling from a high of 60% on the wet side to 25% on the dry side. The wet cycles were of 24 hours duration with the follow-up dry cycles being of 12 hours length except the final dry cycle which was 24 hours. The caked fertilizer sample was removed from the cylinder, placed on a compression tester and subjected to gradually increasing pressure until the cake broke. The pressure was recorded at this point. Four replicate samples were run through the test and the samples were compared to duplicate samples of the reference material (usually diatomaceous earth coated ammonium nitrate prills). The caking index was calculated as the ratio of the average breaking pressure of the specimens of interest to the average of the duplicate reference samples; or as the precent of reference breaking strength. This test measures the caking tendency of a fertilizer sample as a result of crystal bridging or linking of prills because of moisture absorption, moisture migration and salt recrystallization under moderate pressure.

G. T.F.I. Burn Test

A 160 pound sample of ammonium nitrate product was mixed with one 80 pound size Kraft paper bag cut into about 2 inch squares. The mixture was placed on a platform grate inside the 15-¾ inch diameter burn chamber described in *The Fertilizer Institute's* official procedure for classifying ammonium nitrate. Ten pounds of soft pine wood, ½"×2×8" pieces, piled loosely in the space underneath a fire grate, were ignited by a standard railroad fuse under the center of the wood pile. When the heat reached an intensity such that molten ammonium nitrate began to drop into the flames, the fire door was closed, the top of the combustion chamber was covered and dirt was piled around the fire door. This procedure leaves only ammonium nitrate as the source of oxygen. This test is utilized for the purpose of determining how the ammonium nitrate should be classified for packaging, shipping and storage. Any product which exhibited a burning time of one hour or less may not be described as an "ammonium nitrate fertilizer" and is subject to rigid transportation restrictions.

The results of the above tests on the coated ammonium nitrate prills described above are shown in Table I.

TABLE I

| Test | "Similene" Coated Prills | D.E. Coated Prills |
|---|---|---|
| 24-Hr. Ball-Screen Hardness, % | 74 | 100 |
| Single Prill Hardness, kg/cm² | 30 | 40 |
| Deformation: | | |
| % Deformation | 13.2 | 11.0 |
| Degree of Caking | Very slight | Hard |
| 24-Hr. Caking, psi | 0 | 50 |
| Attrition, % | 1.6 | 19.3 |
| Accelerated Caking, kg | 10.4 | 479 |
| T.F.I. Burn Test, min. | 77 | 151 |

EXAMPLE II

Two of the tests which are very important are the T.F.I. Burn Test and the 24-Hour Ball Screen Hardness Test. Of these two tests, the more critically important is the burn test. The test procedure requires that a sample of ammonium nitrate fertilizer must not burn in less than 60 minutes. If the burn time is greater than 60 minutes, then the ammonium nitrate fertilizer sample may be transportation-classified as a fertilizer material. It may be shipped in bulk or packaged in bags by the usual procedure of the fertilizer industry. If the burn time is less than 60 minutes, however, special packaging and handling procedures must be followed, all of which add to the cost of the fertilizer and therefore are intolerable.

In early experimental work, samples of ammonium nitrate prills coated with the amine-mineral oil combination disclosed in U.S. Pat. No. 4,150,965 were subjected to some screening tests; and while giving good results in some of the tests, none passed either the burn test or the Ball-Screen Hardness Test.

Table II below shows coating agent data and test results for a variety of coated ammonium nitrate prills. The test results show that only two coated samples passed the T.F.I. Burn Test, which are the siloxane plus amine coated particles and the siloxane only coated particles. However, the prills coated only with the siloxane exhibited very poor results on the Ball-Screen Hardness Test. Moreover, the particles coated with only the siloxane material remained sticky for several hours after being coated, i.e., until the slow polymerization reaction was completed. Such a coated product is unacceptable and can cause caking problems when the product is loaded into bags, hopper cars, and the like immediately after being coated.

Of all of the coated particulate compositions tested, only the ammonium nitrate particles coated with an amine and a siloxane mixture give good results across the spectrum of tested characteristics. This result was unexpected and was not predictable.

Another advantage of the coating agent of the present invention is that a satisfactory coating can be obtained in one application to a particulate substrate, while for other coatings such as the mineral oil-amine combination, coatings had to be applied in several steps to achieve a satisfactory uniform coating.

Still another advantage of the present coating composition is that it may be applied to cooled fertilizer prills, while a coating of an amine alone, or an amine followed by another coating agent, has to be applied to hot prills. This complicates the coating process since the amine is applied before the prills are cooled. It is therefore very difficult to separate the coating system from the ammonium nitrate synthesis section.

Another consideration concering the disclosure of the technique disclosed in U.S. Pat. No. 4,150,965 is that a specially designed coating drum should be utilized to ensure uniform application of the amine. The flow characteristics of the present amine-siloxane coating agent are quite different from those of amine alone, and therefore an unconventional coating drum is not required.

TABLE II

|  |  | Amine-Siloxane of Example I | Amine + Mineral Oil | Amine Only | Siloxane Only | Amine + Siloxane | Siloxane + Amine + Siloxane |
|---|---|---|---|---|---|---|---|
| A. | Coating Agent Data | | | | | | |
|  | 1. Nomenclature | | | | | | |
|  |   a. 1st component | Amine/Siloxane mixture | Amine | Amine | Siloxane | Amine | Siloxane |
|  |   b. 2nd component | None | Mineral Oil | None | None | Siloxane | Amine |
|  | 2. Coating Level, wt. % | | | | | | |
|  |   a. 1st component | 0.03* | 0.03 | 0.03 | 0.03 | 0.02 | 0.01/0.03 |
|  |   b. 2nd component | — | 0.03 | — | — | 0.01 | 0.03 |
| B. | Test Results** | | | | | | |
|  | 1. 24-Hr. Ball-Screen | 74 | 0 | 52 | 0 | 64 | 0 |
|  | 2. Single prill, kg/cm² | 30 | 32.1 | 28.9 | 39.4 | 28.2 | 29.0 |
|  | 3. Deformation: | | | | | | |
|  |   a. % Deformation | 13.2 | 9.8 | 11.0 | 8.8 | 15.4 | 13.2 |

TABLE II-continued

|  |  | Amine-Siloxane of Example I | Amine + Mineral Oil | Amine Only | Siloxane Only | Amine + Siloxane | Siloxane + Amine + Siloxane |
|---|---|---|---|---|---|---|---|
|  | b. Degree of caking | Very slight | slight | none | mod. | slight | none |
| 4. | 24-Hr. caking, psi | 0 | 0 | 0 | 0 | 0 | 0 |
| 5. | Attrition, % | 1.6 | 1.1 | NA | NA | NA | NA |
| 6. | Accelerated caking, kg | 10.4 | 10.5 | 4.2 | 25.9 | 3.3 | 54.6 |
| 7. | T.F.I. Burn Test, min. | 77 | 51 | 53 | 150 | NA | 57 |

*Component Ratio = 70/30 (Amine/Siloxane)
**NA = Data not available

EXAMPLE III

The data in Table III below reflect on the limitation concerning the amount of coating agent, having the composition shown in Example I, applied to the fertilizer prills and the relative amounts of amine and siloxane components in the coating material. The lower preferred coating limit of 0.01% by wt. is preferred on the basis of practical handling of the coating composition, and not on the basis of actual coating performance. At coating levels less than the preferred lower limit it becomes more difficult to ensure uniform coatings. The upper limit of 0.15% by wt. is preferred because the cost of additional coating material increases faster than benefits derived from additional amounts of coating agents and because the coated prills retain a wet or sticky feel for some time after coating.

The upper ratio value of amine to siloxane of 95:5 is preferred because the amount of siloxane is sufficient to ensure acceptable T.F.I. Burn Test values. A coating of amine alone does not pass the burn test. The lower limit of 60:40 of amine to siloxane is based primarily on material costs and performance in the Accelerated Caking Test as shown in Table III.

TABLE III

| Amine/ Siloxane Ratio | Application Level, % | 24-Hour B.S.H. % | SPH, $kg/cm^2$ | 24-Hr. Caking Test, psi | Deformation Test % deform./caking | Acc. Caking Test, kg |
|---|---|---|---|---|---|---|
| 95/5 | 0.005 | 15 | 33.2 | 0 | 8.8/free flow | 11 |
|  | 0.05 | 62 | 39.9 | 0 | 11.0/free flow | 0 |
|  | 0.2 | 82 | 40.6 | 0 | 11.0/free flow | 0 |
| 80/20 | 0.075 | 13 | 27.9 | 0 | 11.0/free flow | 8 |
|  | 0.10 | 50 | 31.1 | 0 | 11.0/free flow | NA |
|  | 0.15 | 57 | 33.8 | 0 | 11.0/free flow | NA |
| 75/25 | 0.005 | 6 | 46.0 | 0 | 15.4/very slight | 5 |
|  | 0.05 | 27 | 37.0 | 0 | 13.2/free flow | 6 |
|  | 0.2 | 80 | 41.6 | 0 | 15.4/very slight | 10 |
| 55/45 | 0.005 | 9 | 35.1 | 0 | 13.2/very slight | 54 |
|  | 0.05 | 75 | 34.2 | 0 | 15.4/very slight | 21 |
|  | 0.2 | 89 | 39.3 | 0 | 15.4/very slight | 10 |
| 30/70 | 0.005 | 91 | 35.4 | 2 | 13.2/very slight | 58 |
|  | 0.05 | 97 | 37.3 | 0 | 11.0/free flow | 22 |
|  | 0.2 | 92 | 40.6 | 0 | 11.0/free flow | 6 |
| 5/95 | 0.005 | 17 | 45.5 | 0 | 6.6/free flow | 39 |
|  | 0.05 | 25 | 43.9 | 0 | 8.8/free flow | 19 |
|  | 0.2 | 87 | 44.1 | 0 | 8.8/free flow | 13 |

NA = Data not available

EXAMPLE IV

Pilot Plant Results

About 1000 tons of ammonium nitrate coated with the amine-siloxane coating agent of Example I were evaluated in field storage tests. Fertilizer prills coated with 0.03 and 0.06 wt. % coating agent were investigated. 100 tons of bulk ammonium nitrate were stored in an unairconditioned warehouse at temperatures in the mid-80° F. range at high humidity for about 7 weeks. The stored prills at the end of this period were in excellent condition. On the other hand, it is known that diatomaceous earth coated ammonium nitrate particles begin a rapid decline after about three weeks in such an environment.

Some of the test material was transported by pneumatic bulk trucks to an MCC dealer. The material unloaded very easily without the characteristic heavy dusting of diatomaceous earth coated ammonium nitrate particles.

100 ton bulk hopper cars were utilized to transport some of the coated test particles. The cars were in transit for about 2 weeks during which they were subjected to hot weather with full sun most of the time. No problems were encountered unloading the cars at their destination. When diatomaceous earth coated ammonium nitrate prills are transported under these conditions, hard lumps form and caking along the hopper walls occurs.

EXAMPLE V

Table IV below shows the results obtained by coating granular N-P-K fertilizer with the coating agent of Example I.

TABLE IV

| Sample | ppm Dust Evolved |
|---|---|
| Uncoated N-P-K fertilizer | 53 |
| 0.25 wt. % oil coated N-P-K fertilizer | 4 |
| 0.05 wt. % amine-siloxane coated N-P-K | 12 |
| 0.25 wt. % amine-siloxane coated N-P-K | 19 |

The results above show that the coating agent of the present invention provides an effective dust suppressing coating.

EXAMPLE VI

Table V below shows the results obtained upon coating particulate urea impregnated with formaldehyde with the present amino-siloxane coating agent in comparison to uncoated formaldehyde impregnated urea particles and unimpregnated clay coating.

TABLE V

| Sample | 24-Hour Caking Test | Deformation Test %/° |
|---|---|---|
| Uncoated urea | 2 | 15.4/slight |
| Urea coated with amine-siloxane* | 0 | 16.5/slight |
| 3% clay coating on urea | 55 | 15.4/hard |

*90/10 amine/siloxane ratio at 0.02% coating level

The caking results with the particles coated by the amine-siloxane reagent are impressive, especially in contrast to clay coated urea.

Stability Studies on Coated Ammonium Nitrate Prills

A. Burn Test Results on Amine-Siloxane Coated Ammonium Nitrate

Eight sample of particulate ammonium nitrate coated with the amine-siloxane coating composition of Example I were subjected to the burning test described in Section 4.0 of "Definition and Test Procedures for Ammonium Nitrate Fertilizer" published by the Fertilizer Institute, January 16, 1973, Samples 1 to 3 had a 0.06% by wt. coating, while samples 4-8 had a 0.03% by wt. coating. The results are shown in the Table VI.

TABLE VI

| Sample No. | Burning Time | Weight of Residue |
|---|---|---|
| 1 | 1 hr. 40 mins. | 7 lbs. 4 oz. |
| 2 | 59 mins. | 0 |
| 3 | 54 mins. | 0 |
| 4 | 2 hrs. 23 mins. | 0 |
| 5 | 1 hr. 27 mins. | 0 |
| 6 | 58 mins. | 0 |
| 7 | 2 hrs. 40 mins. | 43 lbs. 8 oz. |
| 8 | 1 hr. 13 mins. | 0 |

B. Bulk Storage of Coated Ammonium Nitrate Prills

Four 100 tons piles of ammonium nitrate particles coated with the coating agent of Example I were stored. One pile (0.06% by weight) was stored for 11 weeks while the remaining three piles (one pile having a 0.06% by wt. coating, while the remaining two piles had a 0.03% coating) were stored for 5 weeks. The latter three piles were in excellent condition after the 5 weeks. The 0.06% by wt. level pile had a soft surface crust 1-2 prills deep, composed of dry, swollen prills. Underneath the crust, the ammonium nitrate exhibited a slight set which released into whole prills using minimal force. The two 0.03% by wt. piles had a soft crust of ¼" or less, composed of slightly sugared and swollen prills. There was only slight set underneath the crust. There were little differences in storage features of all of the piles. All three 5 week piles were dry, despite storage under humid conditions and standing water on the warehouse floor.

The 11-week-old pile had a soft surface crust of ½ to 1". The crust formation may have been caused by ammonium nitrate and diatomaceous earth dusts on the pile surface resulting from spillage from an overhead conveyor belt. Under the crust, the ammonium nitrate had only a slight set. The warehouse loader took a scoop from the pile, and transferred the ammonium nitrate to a load-out mechanism. The payloader action had broken the pile set so that most of the ammonium nitrate in the scoop had become free-flowing. The soft cakes that remained were no problem for the load-out mechanism. The coated ammonium nitrate of the present invention was loaded onto a waiting spreader truck with minimal dusting. The payloader cut the 11-week-old 0.06%-level pile in half. The section that had been moved aside broke into dry, free-flowing prills. The material toward the center of the pile was as good as that on the edge, with no noticeable concentration of fines.

A 2-week-old pile of diatomaceous earth coated prills at the warehouse had begun to form large cakes. The ammonium nitrate was damp to the touch at the surface, thereby comparing unfavorably with the product of the present invention. The coated samples of the present invention were characterized by their low moisture and fines content. One sample had 5.9% fines present; this sample was collected by a spike probe, which can cause fines generation. A sample taken from the center of the pile only had 3.4% fines. On the other hand, in a typical diatomaceous earth coated pile in the same storage area, fines became concentrated toward the center of the pile. It is not unusual to find 10-15% fines at the center of a diatomaceous earth coated ammonium nitrate pile.

The coated product of the present invention exhibited single prill hardness values of from 17-28 kg/cm$^2$. These values did not decrease appreciably during storage. The diatomaceous earth sample had a SPH of 23 kg/cm$^2$, which would be considered a low value based on past experience. Every sample had a low Ball-Screen Hardness value (75 balls), except for the sample taken from the center of the pile of amine-siloxane coated particles.

Sample Identification for Table VII 1. 0.06% product, made on 7/20/82; sample taken 3' from floor.
2. 0.06% product made on 6/17/82; sample taken 3' from floor, with spike probe.
3. Sample as sample #2; cake taken from pile.
4. Sample as sample #2; sample taken from middle of pile, after payloader had moved through the pile.
5. 0.03% product made on 7/20/82; sample taken 3' from floor.
6. 0.03% product made on 7/20/82; sample taken 3' from floor.
7. DE-coated reference pile; sample taken 1½' below surface.

TABLE VII

| Sample # | Length of Storage | % H$_2$O | % fines | Single Prill Hardness (kg/cm$^2$) | Ball-Screen Hardness (75 balls) | Attrition Test % fines |
|---|---|---|---|---|---|---|
| 1 | 5 weeks | 0.19 | 2.0 | 23.7 | 2 | — |
| 2 | 11 weeks | 0.20 | 5.9* | 22.5 | 2 | — |
| 3 | 11 weeks | 0.11 | 2.9 | 25.7 | 0 | — |
| 4 | 11 weeks | 0.17 | 3.4 | 27.6 | 67 | 4.0 |
| 5 | 5 weeks | 0.17 | 1.2 | 17.3 | 0 | 4.3 |
| 6 | 5 weeks | 0.17 | 1.6 | 24.4 | 2 | 4.5 |
| 7 | 2 weeks | 0.19 | 3.2 | 22.9 | 1 | — |

*Sample taken with spike probe

C. Additional Coated Ammonium Nitrate Storage Results (1) Bags containing ammonium nitrate prills coated with 0.03% by wt. of the amine-siloxane mixture of Example I and stored since June 1, 1982 were removed from the first layer of a top-out pallet. The bags contained ¼-½" of totally sugared ammonium nitrate powder on the exposed face. These prills had been affected by temperature cycling near the warehouse ceiling. The bag contained whole, free-flowing ammonium nitrate prills below the sugared portion. Prill breakdown was not at other layers of the top-out pallet. The remaining top-out bags had a slight set that released when handled, and contained a small amount of very soft cakes as shown in Table VIII blow.

The quantity of caking increased at the middle pallet. These cakes were very soft, and broke when handled. The most caking was seen at the bottom pallet. The cakes were very soft on the bottom pallet until the 9th (next-to-last) layer was reached. At this layer, the cakes were a mixture of soft and moderate caking.

TABLE VIII

| Pallet/Layer | Number of Bags Sampled | % Caking | Cake Hardness | % Fines |
| --- | --- | --- | --- | --- |
| Top-out/1st | 2 | — | — | 1.2 |
| Top-out/3rd | 2 | 1.8 | very soft | 0.8 |
| Top-out/5th | 2 | 1.0 | very soft | 1.1 |
| Middle/3rd | 2 | 7.5 | very soft | 0.8 |
| Middle/7th | 2 | 18.5 | very soft | 0.7 |
| Bottom/2nd | 2 | 44.3 | very soft | 1.0 |
| Bottom/5th | 3 | 18.7 | very soft | — |
| Bottom/9th | 4 | 36.8 | (¾ moderate; ¼ soft) | — |

| Pallet/Layer | Single Prill Hardness (kg/cm$^2$) | Ball-Screen Hardness (75 balls) |
| --- | --- | --- |
| Top-out/3rd | 22.4 | 0 |
| Middle/3rd | 19.5 | 7 |
| Bottom/2nd | 26.6 | 0 |

(2) Bags containing ammonium nitrate prills coated with 0.06% by wt. of the amine-siloxane coating mixture of Example I and stored since June 17, 1982, which were removed from the first layer of the top-out had 1½-2" of powdered and softly caked ammonium nitrate along the exposed face. Only the top ½" was powdered, the remainder caked. Below the caked portion, the prills were whole and free-flowing. Prill breakdown was only observed on the first layer of the top-out. There was a large quantity of caking throughout the remaining top-out bags. The cake hardness varied from soft to moderate as shown in Table IX below.

The amount of caking remained high throughout the middle and bottom pallets, ranging from 36-74% by wt. The cakes were of moderate hardness. An individual would have had to drop these bags several times to break up the cakes.

This material was produced in the second hour of the June 17 plant test, and had noticeable amounts of DE on the prills. Also, a faint ammoniacal odor was noticed as the bags were cut open. These factors could adversely affect storage.

TABLE IX

| Pallet/Layer | Number of Bags Sampled | % Caking | Cake Hardness | % Fines |
| --- | --- | --- | --- | --- |
| Top-out/1st | 2 | 50.3 | soft | 1.4 |
| Top-out/3rd | 2 | 68.3 | (⅔) moderate; (⅓) soft | 1.0 |
| Top-out/5th | 2 | 52.7 | (⅔) moderate; (⅓) soft | — |
| Middle/3rd | 2 | 43.7 | moderate | — |
| Middle/7th | 2 | 66.4 | moderate | — |
| Bottom/2nd | 2 | 52.5 | moderate | — |
| Bottom/5th | 2 | 73.9 | moderate | — |
| Bottom/9th | 2 | 36.4 | moderate | — |

Note: This ammonium nitrate was produced in 2nd hour of plant test. There was a food deal of diatomaceious earth on the material, which could adversely affect storage.

| Pallet/Layer | Single Prill Hardness (kg/cm$^2$) | Ball-Screen Hardness (75 balls) |
| --- | --- | --- |
| Top-out/3rd | 28.2 | 1 |
| Middle/3rd | 21.7 | 2 |

(3) First layer top-out bags containing ammonium nitrate prills coated with 1.5% by wt. diatomaceous earth and stored since May 31, 1982 had 2" of moderately caked prills along the exposed face. Below the caked portion, the prills were free-flowing. There was no sugaring noticed in the first layer bags. The remaining top-out bags contained small amounts of soft cakes. The quantity of caking was more than seen with equivalently positioned 0.03% amine-siloxane coated ammonium nitrate prills in a bag as shown in Table X below.

The quantity of caking increased slightly at the middle pallet, with soft cakes present. These bags would not have presented problems to a consumer.

The most caking was found at the bottom pallet, ranging from 42-66% by weight. Cake hardness was moderate throughout the bottom pallet. The bags would have to be dropped on the floor several times to break up the cakes.

In considering these results, it must be realized that this product was made on a very cool day, and represents the "best case" situation.

TABLE X

| Pallet/Layer | Number of Bags Sampled | % Caking | Cake Hardness | % Fines |
| --- | --- | --- | --- | --- |
| Top-out/1st | 2 | 35.3 | moderate | 0.8 |
| Top-out/3rd | 2 | 2.6 | soft | 1.0 |
| Top-out/5th | 1 | 11.9 | soft | — |
| Middle/3rd | 2 | 14.8 | soft | 0.7 |
| Middle/7th | 2 | 24.7 | soft | — |
| Bottom/2nd | 2 | 42.3 | moderate | — |
| Bottom/5th | 2 | 65.7 | moderate | — |
| Bottom/9th | 2 | 51.8 | moderate | — |

| Pallet/Layer | Single Prill Hardness (kg/cm$^2$) | Ball-Screen Hardness (75 balls) |
| --- | --- | --- |
| Top-out/3rd | 19.9 | 73 |
| Middle/3rd | 25.6 | 36 |
| Bottom/2nd | 22.8 | 68 |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A particulate fertilizer provided with a protective coating, comprising:

particles of a fertilizer coated with the reaction product of at least one amine compound which is a primary, secondary or tertiary, straight or branched hydrocarbon chain amine or an amine containing a cyclic hydrocarbon radical and a siloxane having lower alkyl, lower alkoxy, lower alkylamino and/or amino substitution.

2. The fertilizer of claim 1, wherein said amine is a single compound or mixture of amines which melts at a temperature of 43° C. to 93° C.

3. The fertilizer of claim 2, wherein said amine is a single compound or mixture of amines which are primary, secondary or tertiary, straight or branched chain amines of 12 to 18 carbon atoms.

4. The fertilizer of claim 3, wherein said amine is a mixture of compounds of the formula:

wherein x is 6, 7 and 8.

5. The fertilizer of claim 1 wherein said siloxane is slightly viscous at ambient temperatures.

6. The fertilizer of claim 5, wherein said siloxane is amino substituted and contains lower alkyl and/or lower alkoxy substituents.

7. The fertilizer of claim 6, wherein said siloxane has the formula:

wherein x is such that said siloxane has a viscosity of about 53 cp at ambient temperature.

8. The fertilizer of claim 1, wherein the weight ratio of amine to siloxane in said coating ranges from 5:95 to 95:5.

9. The fertilizer of claim 8, wherein said range is 70:30 to 90:10.

10. The fertilizer of claim 9, wherein the amount of said coating ranges from 0.01–0.05% by weight.

11. The fertilizer of claim 1, wherein the amount of coating on said fertilizer particles ranges from 0.005% to 0.20% by weight.

12. The fertilizer of claim 1, wherein said fertilizer particles are ammonium nitrate prills.

13. A method of providing fertilizer particles with a protective coating, comprising:
contacting a liquid reaction product of at least one amine compound which is a primary, secondary or tertiary, straight or branched hydrocarbon chain amine or an amine containing the cyclic hydrocarbon radical and a siloxane having lower alkyl, lower alkoxy, lower alkylamino and/or amino substitution at a temperature of 16° C. to about 110° C. with fertilizer particles for a time sufficient to obtain a uniform coating on said fertilizer particles.

14. The method of claim 13, wherein said mixture is applied to said fertilizer particles at a temperature ranging from 54° to 93° C.

15. The method of claim 13 wherein the amount of said mixture applied to said fertilizer particles ranges from 0.005% to 0.2% by weight.

16. The method of claim 13, wherein said fertilizer particles are ammonium nitrate prills.

17. The method of claim 13, wherein the ratio of amine to siloxane in said coating ranges from 5:95 to 95:5.

18. The method of claim 13, wherein said coating mixture has a viscosity of less than about 10 centipose under operating temperature conditions.

19. The method of claim 13 wherein said amine is a single compound or mixture of amines which are primary, secondary or tertiary, straight or branched chain amine compounds of 12 to 18 carbon atoms.

20. The method of claim 13, wherein said siloxane is amino substituted and contains lower alkyl or lower alkoxy substituents and is slightly viscous at ambient temperatures.

* * * * *